United States Patent [19]

Bengtsson et al.

[11] 4,359,212
[45] Nov. 16, 1982

[54] APPARATUS FOR REDUCING FINELY DIVIDED IRON OXIDE MATERIAL

[75] Inventors: Erik A. Bengtsson, Borlänge; Per H. Collin, Stocksund; Sune N. Flink; Björn Widell, both of Västeras, all of Sweden

[73] Assignee: Stora Kopparbergs Bergslags AB, Falun, Sweden

[21] Appl. No.: 229,593

[22] PCT Filed: May 28, 1980

[86] PCT No.: PCT/SE80/00153
§ 371 Date: Jan. 29, 1981
§ 102(e) Date: Jan. 6, 1981

[87] PCT Pub. No.: WO80/02652
PCT Pub. Date: Dec. 11, 1980

[30] Foreign Application Priority Data

May 29, 1979 [SE] Sweden .............................. 79046892

[51] Int. Cl.³ .................... C21B 13/06; C22B 1/10; B01J 8/28
[52] U.S. Cl. ........................................ 266/172; 75/26; 75/35; 75/91; 266/175; 266/182; 422/142; 422/143; 422/145
[58] Field of Search .............. 422/142, 143, 145, 147; 75/9, 26, 35, 91; 266/172, 175, 182

[56] References Cited

U.S. PATENT DOCUMENTS

| | | | |
|---|---|---|---|
| 2,560,175 | 7/1951 | Kalbach | 75/26 |
| 2,733,137 | 1/1956 | Swaine et al. | 422/142 |
| 2,742,353 | 4/1956 | Ogorzaly | 75/26 |
| 2,850,371 | 9/1958 | Brooks et al. | 75/9 |
| 2,894,831 | 7/1959 | Old et al. | 75/26 X |
| 4,042,376 | 8/1977 | Collin | 75/26 |
| 4,073,642 | 2/1978 | Collin et al. | 75/26 X |

FOREIGN PATENT DOCUMENTS

| | | |
|---|---|---|
| 355956 | 5/1973 | Sweden . |
| 384225 | 4/1976 | Sweden . |
| 384226 | 4/1976 | Sweden . |
| 388363 | 10/1976 | Sweden . |

*Primary Examiner*—Barry S. Richman
*Attorney, Agent, or Firm*—Curtis, Morris & Safford

[57] ABSTRACT

Apparatus for reducing finely divided iron oxide material, comprising a reactor containing a vertical upper reaction chamber connected downwardly to a narrower, vertical reaction chamber. A cyclone separator is connected to the upper reaction chamber for separating solid material and recycling it to the reactor so that a circulating fluidized bed can be maintained in the apparatus. In accordance with the invention, a recycling conduit is connected to the bottom of the lower reaction chamber. A tapping-off shaft for reduced material is also connected to the bottom of the lower reaction chamber. A reducing agent is supplied to the upper reaction chamber, and combustion air is supplied to the bottom of the upper reaction chamber. The apparatus also comprises means for preheating the iron oxide material with the exhaust gas from the reactor and for passing said preheated iron oxide into the lower reaction chamber. The apparatus also comprises means for stripping the exhaust gas from $CO_2$ and $H_2O$ and recycling it to the reactor to be used as fluidizing gas.

5 Claims, 2 Drawing Figures

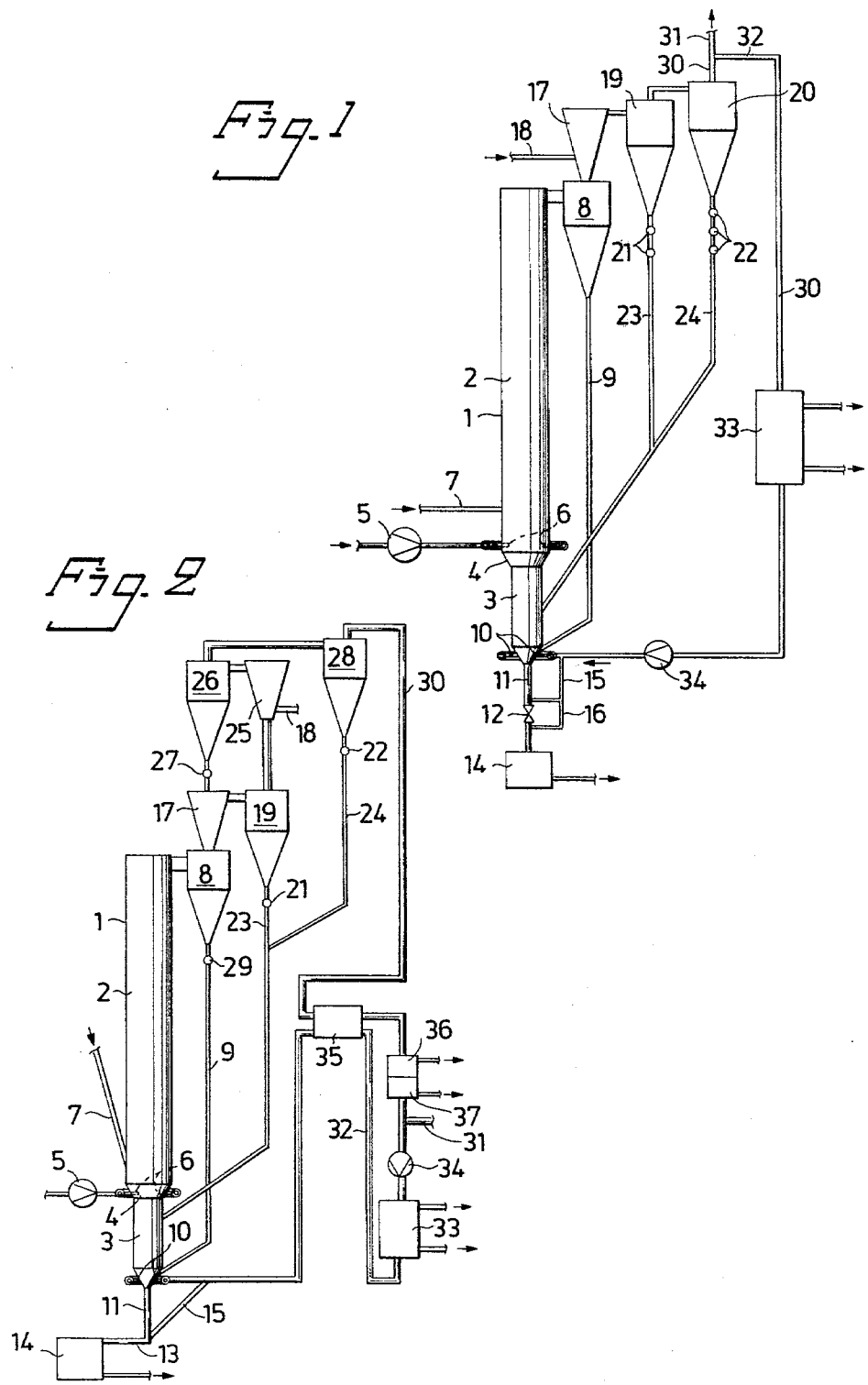

APPARATUS FOR REDUCING FINELY DIVIDED IRON OXIDE MATERIAL

TECHNICAL FIELD

The present invention relates to an apparatus for completely or partially reducing finely divided iron oxide material in a circulating fluidized bed. The reduction should take place at a temperature lower than the melting point of the iron, and will take place in a mixture of iron oxide material and solid carbonaceous material. The solid carbonaceous material is preferably coke obtained from fuels and reducing agents containing carbon, e.g., anthracite, coal or oil. By "finely divided iron oxide-containing material" is intended iron ore concentrates, roasted pyrites or other finely divided iron oxide materials.

BACKGROUND ART

For the description of different fluidized beds and especially circulating fluidized beds, reference is made to L. Reh "Fluidized Bed Processing" Chemical Engineering Progress, Vol. 67, No. 2, February 1971, pages 58–63.

Reference can also be made to the Swedish Patent specification 355 956, relating to a method for carrying out endothermic processes, wherein solid material is treated in a reaction zone consisting of a heavily expanding fluidized bed, i.e. a circulating fluidized bed. A major portion of the solid material is discharged together with gas in a upper part of the fluidized bed reactor. A portion of the heat quantity required for the endothermic process is supplied to the fluidized bed by a gas having a temperature of at least 300° C. The solid material discharged at the upper part of the reactor is separated from the gas in a cyclone separator and is at least partially refluxed to the fluidized bed. This known method is useful, i.a. in reduction processes, e.g. the reduction of gypsum, and chemical processes at high temperature, e.g. the oxidation of ilmenite.

It has already been proposed to produce a molten carbon-containing metal from a metal oxide, e.g. raw iron from iron oxide, by pre-reduction of the metal oxide followed by a smelting reduction, the heat requirement of which is provided to a major extent by electrical heating (Swedish Patent No. 7305753-1, publication number 393 816). An additional fuel, intended for the production of electrical energy, is used here for pre-heating, pre-reduction and other pre-treatment of the raw materials for the smelting reduction, and the remaining heat content in this fuel, as well as in the exhaust gases from the smelting reduction, are used for generating electrical energy which is utilized for the smelting reduction.

The pre-reduction process as described above, i.e. reduction of finely divided iron oxide material mixed with finely-divided solid carbonaceous material, has been further developed in the way described in the Swedish Patent specification No. 7403145-1 (publication number 384 225), a circulating fluidized bed being utilized and a degree of reduction up to 85% being obtained. In this known method the circulating fluidized bed is maintained in a vertically elongate reaction zone by adding to said reaction zone adjusted flows of finely divided solid materials, and possibly also a liquid carbonaceous material, and a gas containing molecular oxygen, and by subjecting departing gas and solid material from the reaction zone to a separation process, separated solid material being recycled into the reaction zone. The finely devided iron oxide material, the carbonaceous material and the gas containing the molecular oxygen are supplied to an intermediate portion of the reaction zone, and the flow of carbon supplied is controlled so that a proportion of coke is always maintained in the bed such that disturbance of the fluidization due to stickiness is prevented. Gas and solid material departing from the reaction zone are taken out from its upper part, the separated solid material being recycled to the intermediate portion of the reaction zone. Solid material containing wholly or partially reduced iron oxide is discharged from the lower part of the reactor zone.

The latter mode of operation has signified a clear improvement of pre-reduction possibilities but it has been found that the result has not been entirely satisfactory. Difficulties have occurred, i.a. due to the iron oxide particles and carbon particles segregating so that the lower part of the reactor is given a considerably greater content of iron oxide than the upper part, while the situation is the opposite for the carbonaceous material. This segregation has resulted in a deteriorated reduction process and in functional disturbances in the plant. The material has furthermore adhered to the air supply nozzles and to the furnace wall around said nozzles.

DISCLOSURE OF THE INVENTION

The present invention provides a solution of these problems and relates to an apparatus in which a product with a degree of metallization of over 60%, and with a desired carbon content, can be produced without disturbances due to segregation or sticking by the material. The invention relates to an apparatus for the complete or partial reduction of finely divided iron oxide material in a circulating fluidized bed, the apparatus including a preferably cylindrical, vertical reactor containing a vertical, elongate upper reaction chamber, a lower, narrower similarly vertical reaction chamber, a conical zone between the reaction chambers, a cyclone separator connected to the upper reaction chamber for separating the solid material from the fluidized bed and recycling it via a recycling conduit to the reactor; supply means for a reduction agent and for iron oxide material, nozzles for supplying combustion air to the reactor, means for supplying a reduction agent and an iron oxide material, means for tapping off reduced material, and means for supplying fluidized gas to the lower reaction chamber. The apparatus of the invention is characterized in that the recycling conduit for the solid material opens in the bottom of the lower reaction chamber. The sticking problem mentioned is eliminated to a considerable degree in such an apparatus, and a high degree of operational reliability can be obtained. The supply nozzles for the combustion air preferably open in the conical zone or in the upper reaction chamber at a height above the conical zone of at most twice the diameter of the lower reaction chamber. The air nozzles preferably extend interiorly of the interior wall of the reactor, preferably a distance which is at least equal to the inner diameter of the nozzles. The interior wall of the reactor preferably consists of a refractory lining.

It is preferred that the quantity of circulating solid material, i.e. the solid material separated in the cyclone separator and recycled to the reactor, is higher than 10 times the quantity of fresh solid material supplied to the apparatus.

DESCRIPTION OF THE DRAWINGS

Two embodiments of the invention are exemplified in the FIGS. 1 and 2.

According to the figures, an apparatus in accordance with the invention comprises a refractory-lined reactor 1 defining a vertically elongate upper reaction chamber 2, preferably cylindrical, and a lower reaction chamber 3, also preferably cylindrical. The height of the lower reaction chamber is $\frac{1}{4}$–1/6 of the total height of the upper reaction chamber, and it has a cross-sectional area which is only $\frac{1}{3}$–$\frac{1}{2}$ of that of the upper reaction chamber. Between the upper and the lower reaction chamber there is a conical zone 4. Combustion air is supplied from a compressor 5 through nozzles 6, which either open into the conical zone 4 (FIG. 2) or into the upper reaction chamber 2, at a distance from the conical zone 4 of at most twice the diameter of the lower reaction chamber 3 (FIG. 1). The nozzles extend from the inside face of the wall of the reactor and inwards thereof, and open out at a distance therefrom, which is at least equal to the inside diameter of the nozzles. The diameter of the nozzles must be sufficient for the combustion air blown in to be given an impulse or a momentum sufficient for rapidly mixing the air with the content in the reaction chamber. The direction of the nozzles can possibly deviate from the horizontal plane by at most 45° downwards or at most 80° upwards. Above the nozzles there are one or more delivery openings for carbonaceous powder supplied through a conduit 7. The upper reaction chamber 2 is connected to a refractory-lined main cyclone separator 8 for separating solid material in the departing gas. A conduit 9 goes from the cyclone separator 8 to recycle the solid material to the bottom of the lower reaction chamber 3. For the supply of reducing fluidizing gas there are nozzles 10 opening out in the bottom of the lower reaction chamber 3. A narrow tapping shaft 11 is also connected to the bottom, the shaft being downwardly connected via a valve 12 (FIG. 1) or fluidizing trap 13 (FIG. 2) with a cooling means 14 for cooling the tapped material. A branch pipe 15 extends from the main fluidizing gas conduit 32 to the lower portion of the tapping shaft 11. The gas thus flowing upwards through the shaft 11 prevents the discharged material from packing together in said shaft, and may also create a wind-separating effect in said shaft, so as to remove lighter carbon particles from the discharged material in the shaft 11. Gas is also taken via a pipe 16 to the valve 12 as well, (FIG. 1), this valve being suitably powder-tight but not gas-tight, which prevents the powder from packing and clogging the valve.

The exhaust gas from the cyclone separator 8 is taken to a venturi preheater 17, in which it meets the ore concentrates which is fed in via a supply pipe 18 (FIG. 1). Two or more dust cyclone separators 19, 20 are connected in series to the venturi pre-heater 17, these cyclone separators separating the ore concentrates from the departing gas and returning the dust to the lower reaction chamber 3 via dust pipes 23, 24 provided with gas traps 21, 22.

According to FIG. 2, the ore concentrates is preheated by the gas from the first dust cyclone separator 19 going to a second venturi preheater 25, to which the ore concentrates is fed through a supply pipe 18. The ore concentrate is separated from the gas in a second dust cyclone separator 26, and is discharged to the previously mentioned venturi preheater 17 via a gas trap 27. The exhaust gas is cleaned in an additional dust cyclone separator 28. The solid material from the main cyclone separator 8 suitably passes through a gas trap 29. The gas traps 21, 22, 27, 29, which can be sluice valves or powder locks, let dust through but prevent gas from flowing up into the cyclone separators. To the outlet 30 from the last dust cyclone separators 20, 28 there is connected an outlet 31 for excess gas, suitably connected to an energy recovery equipment, e.g. a steam power electrical plant. The outlet conduit 30 is also connected to a conduit 32 which contains a gas compressor 34 and a washing apparatus 33 for removing $H_2O$ and $CO_2$ from the gas. The gas is conveyed to the bottom of the lower reaction chamber 3 and discharge shaft 11.

FIG. 2 illustrates how the exhaust gas from the last dust cyclone separator 28 is used in a heat exchanger 35 for reheating the reflux gas. The gas is conveyed through a cooler 36 and a dust separator 37, e.g. an electrofilter, before it reaches the gas compressor 34. The gas withdrawn through the conduit 31 is preferably utilized for energy production in a gas turbine.

EXAMPLE

An apparatus as illustrated in FIG. 1, was built for a working pressure of 5 bar. The upper reaction chamber had a height of 20 meter and a diameter of 0.45 m. Fine-grained iron ore concentrate with an iron content of 67% was reduced in the following way.

Ore concentrates flowing at a rate of 300 kg/h, with a mean granular size of 0.1 mm, was fed into the venturi preheater 17, where it was heated by gas departing from the cyclone separator 8. The preheated ore concentrates was collected in the first dust cyclone 19 and was conveyed via the conduit 23 down to the lower reaction chamber 3, where it was mixed into a circulating fluidized bed. This fluidized bed was maintained by the reducing gas supplied to the bottom via pipes 10, and extended up into the upper reaction chamber 2. Powdered steam coal having an average particle size of 0.2 mm was taken in through the supply pipe 7. This powdered coal was transformed into coke in the fluidized bed. It was supplied in such a quantity that (1) it produced the necessary reducing gas for the reduction, (2) it kept the coke content in the bed between 20 and 50 percent by weight, in spite of the tapping-off of reduced material which took place, and (3) it provided, by partial combustion, the heat required for the reduction and the heat losses from the apparatus. If the heat losses are overlooked, these not corresponding to the losses on an industrial scale, due to the small dimensions of the apparatus, the powdered coal supply corresponded to 700 kg coal per ton Fe. Preheated air was supplied through the air nozzles 6 in the amount required for giving the necessary heat for the reduction and maintaining the temperature at 970° C. by partial combustion of gases and carbonaceous material. By supplying reducing gas to the lower reaction chamber, the same gas velocity was set there as in the upper reaction chamber, and the whole reactor was filled with the circulating fluidized bed. About 5 ton/h of the solid material migrated over into the cyclone separator 8, where it was separated from the gas and recycled to the bottom of the lower reaction chamber. The gas rate in the pipe 15, connected to the discharge shaft 11 from the lower reaction chamber, was adjusted so that a wind separation was achieved in the shaft 11, to the effect that the lighter carbon particles were blown away from the heavier iron particles. A product with a degree of metallization of 70% and containing 10% by weight of carbon was discharged in a quantity corresponding to the supplied quantity of iron ore concentrates. The gas departing from the dust cyclone separator 19 was further cleaned in the dust cyclone separator 20, the dust being recycled to the lower reaction chamber 3. A portion of the gas departing from the dust cyclone separator was cleaned in a washing means 33 from water and carbon dioxide, and subsequently used as fluidizing gas in the lower reaction chamber 3 and in the discharge shaft 11. The remainder of the gas was used for other purposes, e.g. the production of steam in an exhaust gas steam boiler and the production of electrical energy therefrom.

The wind-separation in the discharge shaft 11 may be carried so far that the discharged material contains practically no carbon. If desired, carbon may be added to said discharged material, e.g. dust rich in carbon taken from the dust cyclone separator 19.

We claim:

1. Apparatus for reducing finely divided iron oxide material in a circulating fluidized bed, comprising a reactor (1) containing a vertical upper reaction chamber (2), downwardly connected to a lower, narrower, vertical reaction chamber (3), a cyclone separator (8) connected to the upper reaction chamber for separating the solid material from the circulating fluidized bed, a recycling conduit (9) from the cyclone separator to the reactor, nozzles (6) for supplying combustion air to the reactor, means (7) for supplying a reduction agent and an iron oxide material (18), means (11) for tapping off reduced material, and means (10) for supplying fluidizing gas to the lower reaction chamber, said recycling conduit (9) for the solid material opening into the bottom of the lower reaction chamber, said nozzles (6) for combustion air extending interiorly of an interior wall of the reactor at a distance which is at least equal to an inner diameter of the nozzles, and said means for tapping-off comprising a shaft (11) connected to the bottom of the lower reaction chamber (3), and of a lesser cross-sectional area than the lower reaction chamber and about less than $\frac{1}{4}$ of the cross-sectional area thereof, said tapping-off means including a sluice (13) connected to said shaft for tapping-off the reduced material.

2. The apparatus as defined in claim 1 wherein the supply means for the iron oxide material consists of a first venturi preheater (17) connected to the gas outlet of the cyclone separator (8), and connected to a first dust cyclone separator (19) for separating preheated ore concentrates, said first dust cyclone separator being connected to the reactor (1) via a conduit (23), and a second venturi preheater (25) having an inlet (18) for ore concentrates and being connected to a second dust cyclone separator (26) for separating preheated ore concentrates, said second dust cyclone separator being arranged to deliver the collected preheated ore concentrates to the first venturi preheater.

3. The apparatus as defined in claim 2 and wherein the cross-sectional area of the lower reaction chamber (3) is about $\frac{1}{3}-\frac{1}{2}$ of the cross-sectional area of the upper reaction chamber (2).

4. The apparatus as defined in claim 2 and wherein the conduit (23) from the first dust cyclone separator (19) is connected to the lower reaction chamber (3).

5. The apparatus as defined in claim 2 and wherein the tapping-off means includes a fluidizing gas supply pipe (15), said tapping-off shaft (11) and said fluidizing gas supply pipe (15) being dimensioned and disposed such that the tapped-off reduced material is fluid flow-separated to a lower carbon content.

* * * * *